United States Patent
Tanonaka

(10) Patent No.: US 9,181,053 B2
(45) Date of Patent: Nov. 10, 2015

(54) PAPER-FEEDING DEVICE AND IMAGE FORMING APPARATUS

(71) Applicant: KYOCERA DOCUMENT SOLUTIONS INC., Osaka (JP)

(72) Inventor: Atsushi Tanonaka, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 49 days.

(21) Appl. No.: 13/677,620

(22) Filed: Nov. 15, 2012

(65) Prior Publication Data

US 2013/0120778 A1    May 16, 2013

(30) Foreign Application Priority Data

Nov. 15, 2011 (JP) .................................. 2011-249540
Oct. 29, 2012 (JP) .................................. 2012-237633

(51) Int. Cl.
| | |
|---|---|
| G06K 15/00 | (2006.01) |
| B65H 5/00 | (2006.01) |
| B41J 11/00 | (2006.01) |
| G03G 15/00 | (2006.01) |
| G06K 15/16 | (2006.01) |
| B65H 5/06 | (2006.01) |
| B65H 7/02 | (2006.01) |

(52) U.S. Cl.
CPC ............. *B65H 5/00* (2013.01); *B41J 11/0095* (2013.01); *B65H 5/062* (2013.01); *B65H 7/02* (2013.01); *G03G 15/657* (2013.01); *G06K 15/00* (2013.01); *G06K 15/16* (2013.01); *B65H 2511/20* (2013.01); *B65H 2511/417* (2013.01); *B65H 2513/511* (2013.01); *B65H 2553/82* (2013.01); *B65H 2701/1311* (2013.01); *B65H 2701/1313* (2013.01); *G03G 2215/00721* (2013.01)

(58) Field of Classification Search
USPC ........................................................ 358/1.15
See application file for complete search history.

(56) References Cited

U.S. PATENT DOCUMENTS

| | | | | |
|---|---|---|---|---|
| 6,040,923 | A | * | 3/2000 | Takashimizu et al. ........ 358/498 |
| 2010/0239344 | A1 | * | 9/2010 | Mihara .......................... 399/405 |
| 2010/0289210 | A1 | | 11/2010 | Nakazawa |

FOREIGN PATENT DOCUMENTS

| | | | | |
|---|---|---|---|---|
| JP | 20-28667 | A | | 1/1990 |
| JP | 02028667 | A | * | 1/1990 ............. G03G 15/00 |

(Continued)

OTHER PUBLICATIONS

English Abstract for JP 2-28667 A, published Jan. 30, 1990.
English language machine translation for JP 2003-160258 A, published Jun. 3, 2003.
English language abstract for JP H03-063193 A, published Mar. 19, 1991.

(Continued)

*Primary Examiner* — Ashish K Thomas
*Assistant Examiner* — Neil R McLean
(74) *Attorney, Agent, or Firm* — NDQ&M Watchstone LLP

(57) ABSTRACT

A paper-feeding device, during a paper leading edge detection interval that includes an expected point in time of arrival of a paper leading edge at a paper sensor installation location, and during a paper trailing edge detection interval that includes an expected point in time of passage of a paper trailing edge, allows the signal level of a paper detection signal that is outputted to a main body section to fluctuate on the basis of an actual output value of a paper sensor, and during a transition interval from the paper leading edge detection interval to the paper trailing edge detection interval, locks the paper detection signal that is outputted to the main body section, to the signal level at the end of the paper leading edge detection interval.

13 Claims, 8 Drawing Sheets

(56) References Cited

FOREIGN PATENT DOCUMENTS

| JP | H03-063193 A | 3/1991 |
| JP | H06-135074A A | 5/1994 |
| JP | 2003-160258 A | 6/2003 |
| JP | 2010-264628 A | 11/2010 |

OTHER PUBLICATIONS

English language machine translation for JP 2010-264628 A, published Nov. 25, 2010.
English language machine translation for JP H06-135074 A, published May 17, 1994.

* cited by examiner

PAPER-FEEDING DEVICE AND IMAGE FORMING APPARATUS

INCORPORATION BY REFERENCE

This application is based upon and claims the benefit of priority from the corresponding Japanese Patent Application No. 2011-249540 filed Nov. 15, 2011 and Japanese Patent Application No. 2012-237633 filed Oct. 29, 2012, the entire contents of which are incorporated herein by reference.

FIELD

The present disclosure relates to a paper-feeding device and an image forming apparatus.

BACKGROUND

An image forming apparatus for printing and outputting paper is provided with a paper-feeding device for supplying the paper to the image forming apparatus main body. In some cases, a paper-feeding device of such description is an optional device detachably attached to the image forming apparatus, while in other cases it is provided as standard equipment to the image forming apparatus.

A paper-feeding device for supplying paper to an image forming apparatus main body includes, for example, a paper feed conveyance path that connects to the paper feed conveyance path of the image forming apparatus main body. Paper accommodated in a paper accommodation body of the paper-feeding device is sent out from the paper accommodation body by a paper feed roller or the like onto the paper feed conveyance path; and, while being guided along the paper feed conveyance path, is supplied to the paper feed conveyance path of the image forming apparatus main body.

The paper feed conveyance path of the paper-feeding device is typically equipped with paper sensors for detecting the state of conveyance of the paper along the paper feed conveyance path. For example, paper sensors may be disposed at locations along the paper feed conveyance path, and the motor or clutch for driving various rollers such as the paper feed roller is controlled based on output values from the paper sensors. Output values from the paper sensors can also be utilized to detect paper jams along the paper feed conveyance path, and to perform other such operations.

For example, in a conventional paper-feeding device, a signal that directly reflects fluctuation of the output value of a paper sensor is outputted to the controller of the image forming apparatus main body. The controller of the image forming apparatus main body then detects the state of conveyance of the paper or performs other such operations on the basis of the signal that directly reflects the fluctuation of the output value of the paper sensor.

In this instance, as long as the paper sensor is operating normally, once the leading edge of the paper reaches the paper sensor installation location on the paper feed conveyance path, the output value of the paper sensor changes to a value showing that paper is present, and during the interval that the paper is passing by the paper sensor installation location, the paper sensor continues to output the same value. Thereafter, once the trailing edge of the paper has passed the paper sensor installation location, the output value of the paper sensor changes to a value showing that paper is not present at the paper sensor installation location.

However, when a paper sensor temporarily experiences abnormal operation while the paper is conveyed, in some instances there may be a temporary change in values outputted by the paper sensor. For example, a value showing that paper is not present may be outputted in spite of the fact that paper is currently passing the paper sensor installation location; conversely, a value showing that paper is present may be outputted in spite of the fact that paper is not currently passing the paper sensor installation location. At such times, when a signal directly reflecting fluctuation of the output value of the paper sensor is outputted to the controller of the image forming apparatus main body, a detection error arises during detection of the state of conveyance of the paper.

SUMMARY

With the foregoing in view, it is an object of the present disclosure to provide a paper-feeding device and an image forming apparatus whereby it is possible to reduce detection errors during detection of the state of conveyance of the paper.

To achieve the stated object, the paper-feeding device of the present disclosure is a paper-feeding device adapted to feed paper to a main body section of an image forming apparatus for printing and outputting paper, the paper-feeding device including a conveyance path, a paper detection section, and an output section. The conveyance path conveys the paper towards the main body section. The paper detection section has a paper sensor for detecting paper on the conveyance path, and that, on the basis of an output value of the paper sensor, generates a paper detection signal showing the state of conveyance of the paper. The output section outputs the paper detection signal to the main body section, the main body section recognizing the state of conveyance of the paper on the basis of the paper detection signal. During a paper leading edge detection interval that includes an expected point in time of arrival of a paper leading edge at a paper sensor installation location, and during a paper trailing edge detection interval that includes an expected point in time of passage of a paper trailing edge from the paper sensor installation location, the paper detection section allows the signal level of the paper detection signal that the output section outputs to the main body section to fluctuate on the basis of an actual output value of the paper sensor, and during a transition interval from the paper leading edge detection interval to the paper trailing edge detection interval, locks the paper detection signal that the output section outputs to the main body section, to the signal level at the end of the paper leading edge detection interval, regardless of the output value of the paper sensor.

DETAILED DESCRIPTION

Figure 1:
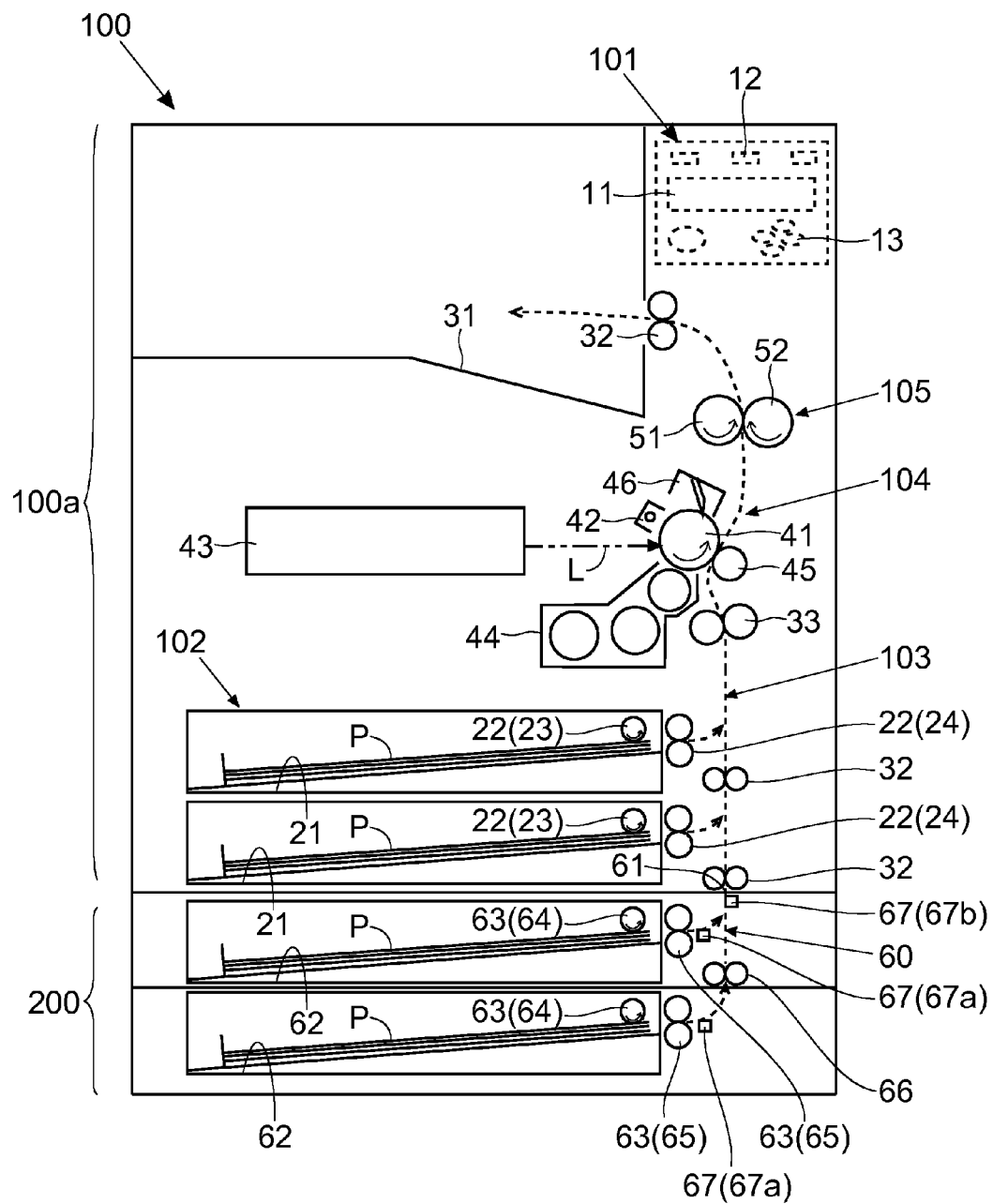
FIG. 1 is a schematic drawing of an image forming apparatus provided with a paper-feeding device according to an embodiment of the present disclosure.

Firstly, the overall configuration of an image forming apparatus 100 according to an embodiment of the present disclosure is described with reference to FIG. 1.

The image forming apparatus 100 according to the present embodiment is a printer that, on the basis of image data, prints a desired image onto paper P and outputs the paper P. The main body section 100a of this image forming apparatus 100 (the printing output section, which prints and outputs the paper P) is provided with an operation panel 101, a main body paper feeding section 102, a main body conveyance section 103, an image formation section 104, a fixing section 105, and the like.

The operation panel 101 includes a liquid crystal display section 11 for displaying an error condition, and the like. The operation panel 101 also includes an indicator 12 that alerts of an error condition and the like by flashing of a light-emitting element (for example, an LED). The operation panel 101 is further equipped with setting keys 13 for receiving various settings made by a user.

The main body paper feeding section 102 has a plurality of paper cassettes 21 for accommodating the paper P, the paper accommodated in the plurality of paper cassettes 21 being supplied to the main body conveyance section 103. This main body paper feeding section 102 is equipped with paper feed rollers 22 for feeding the paper P to the main body conveyance section 103. The paper feed rollers 22 include pickup rollers 23 that contact the paper P accommodated in the paper cassettes 21 and draw out the paper P therefrom, separating roller pairs 24 for sending out the paper P to the main body conveyance section 103 while suppressing multi-feed of the paper P drawn out from the paper cassettes 21, and the like.

The main body conveyance section 103 conveys the paper P through the main body section 100a. Specifically, the paper P fed from the main body paper feeding section 102 is conveyed by the main body conveyance section 103, and is thereby made to pass in succession through the image formation section 104 and the fixing section 105, and is guided into a discharge tray 31. This main body conveyance section 103 is equipped with a plurality of conveyance roller pairs 32 for conveying the paper P. The main body conveyance section 103 is further equipped with a resist roller pair 33 for pausing the paper P short of the image formation section 104, then conveying the paper P to the image formation section 104 in a manner coincident with a certain timing.

The image formation section 104 forms a toner image on the basis of the image data, and transfers the toner image to the paper P. The image formation section 104 includes a photoreceptor drum 41, a charging device 42, an exposure device 43, a developing device 44, a transfer roller 45, a cleaning device 46, and the like.

For the toner image formation process and the transfer process of the toner image to the paper P, firstly, the photoreceptor drum 41 is driven to rotate, and the surface of the photoreceptor drum 41 is charged to predetermined potential by the charging device 42. The exposure device 43 outputs a light beam L on the basis of image data of an image to be formed, and performs scanning and exposure of the surface of the photoreceptor drum 41, the surface of which has been charged. An electrostatic latent image is thereby formed on the photoreceptor drum 41. The developing device 44 next supplies toner to the electrostatic latent image formed on the surface of the photoreceptor drum 41, and develops the image.

The transfer roller 45 is capable of rotating while pressed against the surface of the photoreceptor drum 41. Thereafter, while gauging a certain timing, the resist roller pair 33 prompts the paper P to advance between the transfer roller 45 and the photoreceptor drum 41. A predetermined voltage is applied to the transfer roller 45 at this time. The toner image on the surface of the photoreceptor drum 41 is thereby transferred to the paper P. Once the transfer process is finished, the cleaning device 46 removes any toner or the like remaining on the surface of the photoreceptor drum 41.

Through the application of heat and pressure, the fixing device 105 fixes the toner image that has been transferred to the paper P. The fixing device 105 includes a fixing roller 51 incorporating an internal heat source, and a pressure roller 52 that presses against the fixing roller 51. The paper P to which the toner image has been transferred is then heated and pressed by being passed between the fixing roller 51 and the pressure roller 52. The toner image is thereby fixed onto the paper P, and printing is completed. The printed paper P is sent to the discharge tray 31 by the conveyance roller pairs 32.

Separately from the main body paper feeding section 102, a paper-feeding device 200 for supplying the paper P to the main body section 100a is installed in the image forming apparatus 100 of the present embodiment. The paper-feeding device 200 may be an optional device detachably attached to the image forming apparatus 100, or provided as standard equipment to the image forming apparatus 100.

This paper-feeding device 200 has a paper feed conveyance path 60 (conveyance path) for conveying the paper P towards the main body section 100a. One end of the paper feed conveyance path 60 connects to the main body conveyance section 103. The paper-feeding device 200 discharges the paper P from a paper discharge port 61 formed at one end of the paper feed conveyance path 60 (a linking section connected to the main body conveyance section 103), and supplies the paper P to the main body conveyance section 103.

The paper feed conveyance path 60 connects at the other end thereof to paper cassettes 62 for accommodating the paper P. Two paper cassettes 62 are equipped, and the paper feed conveyance path 60 connects at the other end thereof in a respective manner to these two paper cassettes 62. The paper feed conveyance paths 60 that connect to the paper cassettes 62 converges at a point short of the paper discharge port 61. The number of paper cassettes 62 equipped to the device is not particularly limited; one is acceptable, as is three or more.

The paper P accommodated in the paper cassettes 62 is fed to the paper feed conveyance path 60 by a paper feeding section 63. The paper feeding section 63 includes pickup rollers 64 that contact the paper P accommodated in the paper cassettes 62 and send out the paper P therefrom; separating roller pairs 65 for conveying the paper P to the paper feed conveyance path 60 while suppressing multi-feed of the paper P drawn out from the paper cassettes 62, and the like.

The paper feed conveyance path 60 is further equipped with a conveyance roller pair 66 for conveying the paper P that has been supplied to the paper feed conveyance path 60. FIG. 1 illustrates an example of a case in which the conveyance roller pair 66 disposed on the paper feed conveyance path 60 is one in number; however, the number of conveyance roller pairs 66 may be modified according to the length of the paper feed conveyance path 60. Because a greater number of installed paper cassettes 62 means a longer paper feed conveyance path 60, the number of conveyance roller pairs 66 may be increased commensurately.

The paper feed conveyance path 60 is equipped with a plurality of paper sensors 67. Specifically, the paper sensors 67 include paper sensors 67 that are installed at the upstream side of the paper feed conveyance path 60, and a paper sensor 67 that is installed at the downstream side of the paper feed conveyance path 60. Each of the paper feeding sections 63 situated at the starting point of the paper feed conveyance path 60 has one of the upstream-side paper sensors 67 disposed in proximity thereto (to the downstream side with respect to the paper feeding sections 63). The one downstream-side paper sensor 67 is disposed in proximity to the paper discharge port 61 formed at the ending point of the paper feed conveyance path 60 (to the upstream side with respect to the paper discharge port 61). In the following description, in certain cases, the upstream-side sensors 67 disposed in proximity to the paper feeding sections 63 are designated as paper feed sensors 67a, and the downstream-side sensor 67 disposed in proximity to the paper discharge port 61 is designated as a paper eject sensor 67b.

The paper sensors 67 are transmission type optical sensors having a light-emitting section, a light-receiving section, and an actuator (not illustrated) that rotates by coming into contact with the paper P. The optical path between the light-emitting section and the light-receiving section is obstructed by this actuator when the paper P is not in contact with the actuator (when the paper P is not present at the installation location of the paper sensor 67). On the other hand, because the actuator rotates when contacted by the paper P (when the paper P is present at the installation location of the paper sensor 67), the optical path between the light-emitting section and the light-receiving section is no longer obstructed thereby. Therefore, the output value of the optical sensor 67 changes depending on whether the paper P is present or absent at the installation location of the paper sensor 67. Consequently, on the basis of the output value of the paper sensor 67, arrival or passage of the paper P can be detected in proximity to the paper feeding sections 63 and in proximity to the paper discharge port 61.

Optical sensors other than transmission type optical sensors may be employed as the paper sensors 67 as well. Reflection type optical sensors, which detect the presence and absence of the paper P from light reflected off the surface of the paper P, may be employed as the paper sensors 67 as well. Alternatively, ultrasonic sensors or the like, rather than optical sensors, may be employed as the paper sensors 67.

Figure 2:
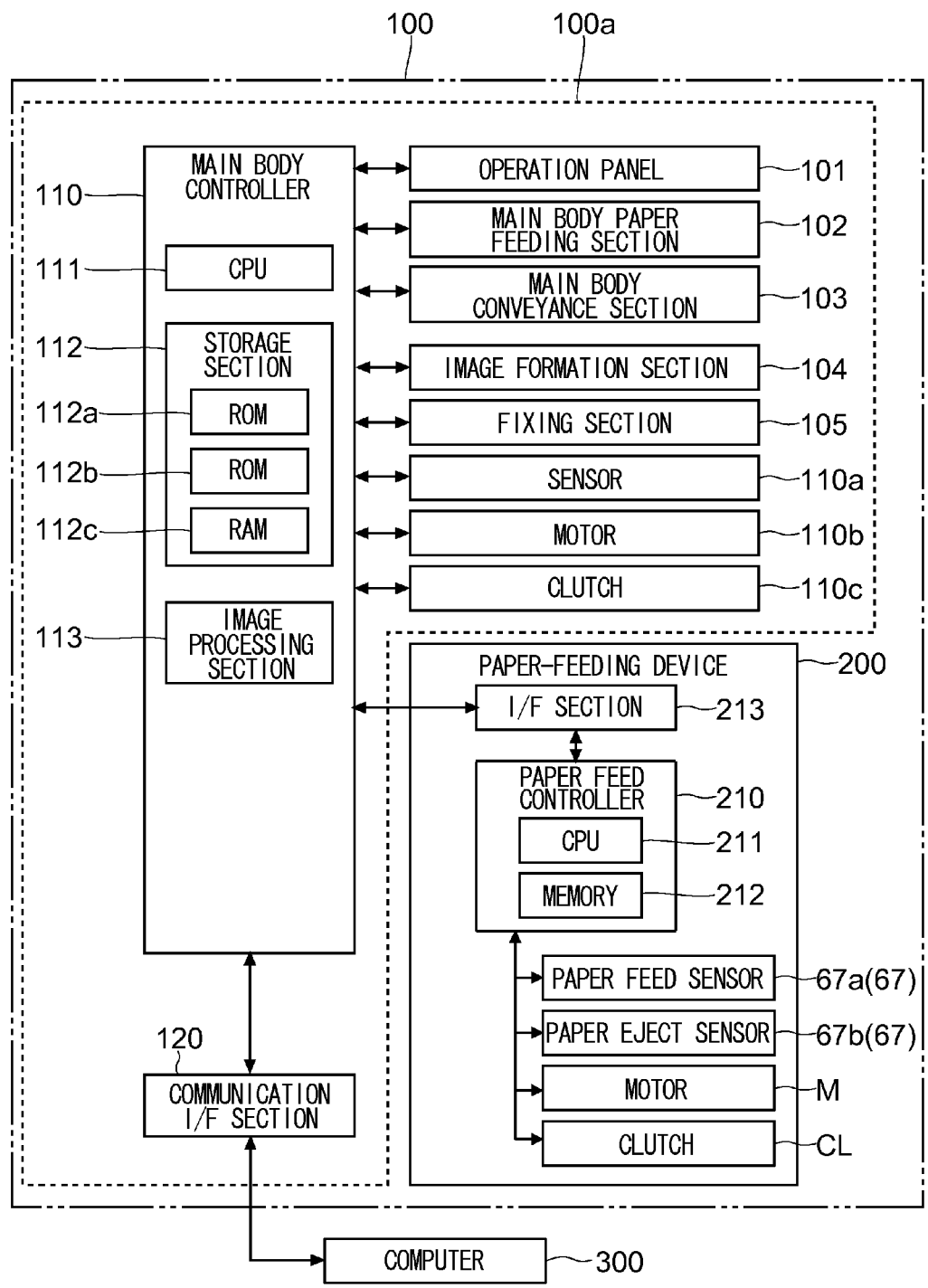
FIG. 2 is a drawing showing the hardware configuration of the image forming apparatus provided with the paper-feeding device shown in FIG. 1.

Next, the hardware configuration of the image forming apparatus 100 is described with reference to FIG. 2.

The main body section 100a of the image forming apparatus 100 includes a main body controller 110 responsible for overall control of the device. This main body controller 110 has a central processing unit (CPU) 111, a storage section 112, an image processing section 113, and the like. In order to control the operation of the sections of the main body section 100a (the operation panel 101, the main body paper feeding section 102, the main body conveyance section 103, the image formation section 104, and the fixing section 105), the main body controller 110 is connected to sensors 110a for performing various classes of detection, such as detection of the paper P, and to a motor 110b and a clutch 110c for rotating the various rotating elements. The main body controller 110 may be divided into a part that performs overall control of the image forming apparatus 100 and image processing, and a part that performs control of the rotating elements.

The storage section 112 includes a flash ROM 112a containing a program for operating the sections of the image forming apparatus 100 (the operation panel 101, the main body paper feeding section 102, the main body conveyance section 103, the image formation section 104, and the fixing section 105); a data preservation (backup) EEPROM 112b for storing data of various types; a RAM 112c into which programs and data are loaded; and the like.

The image processing section 113 includes an image processing-specific ASIC or the like, and carries out image processing of various kinds, such as enlarging/shrinking, density conversion, and the like, on image data. Image data having undergone image processing by the image processing section 113 is then converted to image data that is processable by the image formation section 104, and is transferred to the image formation section 104. The image formation section 104 can thereby perform printing on the basis of the image data.

The main body controller 110 is connected to a communication I/F section 120 for communicating with an external computer 300. The external computer 300 connected to this communication I/F section 120 may be, for example, a personal computer, server, or the like. The communication I/F section 120 acquires image data from the external computer 300, and transfers the data to the main body controller 110. The main body controller 110 thereby makes the sections to carry out a printing process on the basis of the image data.

The main body controller 110 is further connected to a paper feed controller 210 equipped in the paper-feeding device 200. This paper feed controller 210 includes a CPU 211, a memory 212, and the like, and is connected to an I/F section 213 for sending and receiving signals to and from the main body controller 110. Upon receiving a paper feed instruction from the main body controller 110, the paper feed controller 210 drives the paper feeding section 63 and the various rotating elements such as the conveyance roller pairs 66 on the basis of a paper feed-controlling program or data stored in the memory 212, and initiates operation to supply the paper P to the main body section 100a.

Specifically, the paper feed controller 210 is connected to a motor M for driving the paper feeding section 63 and the conveyance roller pairs 66, and controls driving of the motor M. When the paper P is to be supplied to the main body section 100a, the paper feed controller 210 drives the paper feeding section 63 and the conveyance roller pairs 66 by driving the motor M; and, when supply of the paper P to the main body section 100a is complete, stops driving the motor M to stop driving of the paper feeding section 63 and the conveyance roller pairs 66.

In a case in which multiple sheets of the paper P are to be supplied in succession to the main body section 100a, driving and stopping of the paper feeding section 63 must be repeated in order to maintain a constant distance between sheets (in order to feed the paper at constant spacing). For this reason, a clutch CL is equipped for switching between driving and stopping the paper feeding section 63, control of the clutch CL being performed by the paper feed controller 210. In so doing, for example, driving of the conveyance roller pairs 66 can be maintained while switching between driving and stopping of the paper feeding section 63.

The paper feed controller 210 is connected to the paper sensors 67 (the paper feed sensors 67a and the paper eject sensor 67b). Specifically, the output values of the paper sensors 67 are received by the paper feed controller 210. The paper feed controller 210 presented with output values from the paper sensors 67 generates a paper detection signal showing the state of conveyance of the paper P along the paper feed conveyance path 60 on the basis of the output values from the paper sensors 67. The paper feed controller 210 then outputs the paper detection signal to the main body controller 110 through the I/F section 213. In the present embodiment, the paper feed controller 210, including the paper sensors 67, corresponds to the "paper detection section," and the I/F section 213 corresponds to the "output section."

Figure 3A:
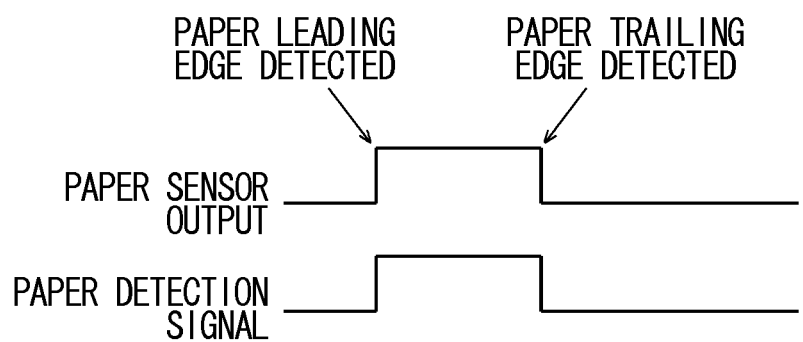
FIG. 3A is a drawing describing the behavior of a paper detection signal for detecting the state of conveyance of the paper.

As shown in FIG. 3A, when the leading edge of the paper P reaches the installation location of a paper sensor 67 on the paper feed conveyance path 60, the output value of the paper sensor 67 rises, and when the trailing edge of the paper P passes through the installation location of a paper sensor 67, the output value of the paper sensor 67 falls. At this time, the paper feed controller 210, having received the output value of the paper sensor 67, brings the paper detection signal that the I/F section 213 outputs to the main body controller 110 to a signal level that directly reflects the output value of the paper sensor 67. In so doing, the main body controller 110 can determine, on the basis of the paper detection signal, whether the paper P is being conveyed in normal fashion through the paper-feeding device 200.

Figure 3B:
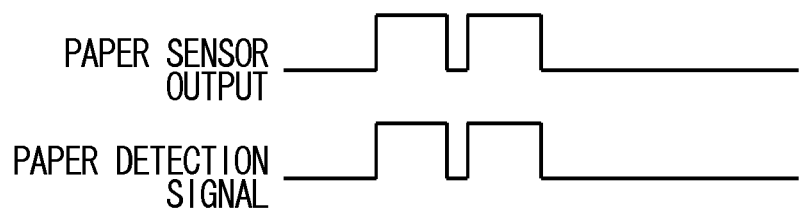
FIG. 3B is a drawing describing the behavior of a paper detection signal for detecting the state of conveyance of the paper.

However, as shown in FIG. 3B, it sometimes happens that the paper sensor 67 experiences abnormal operation as the paper P is passing by the installation location of a paper sensor 67, causing the output value of the paper sensor 67 to temporarily fall. Or, it sometimes happens that after the paper P has passed the installation location of a paper sensor 67, the actuator of the paper sensor 67 or the like bounces, and the actuator is temporarily displaced. At this time, when the paper detection signal being outputted to the main body controller 110 is at a signal level that directly reflects the output value of the paper sensor 67, the main body controller 110 determines in error that the paper P is not being conveyed in normal fashion, despite that fact that the paper P is being conveyed in normal fashion through the paper-feeding device 200, and stops the printing process.

In order to resolve this inconvenience, during a paper leading edge detection interval that includes the expected point in time of arrival of the leading edge of the paper P at the installation locations of the paper sensors 67 (the paper feed sensors 67a and the paper eject sensor 67b), and during a paper trailing edge detection interval that includes the expected point in time of passage of the trailing edge of the paper P, the paper feed controller 210 of the present embodiment causes the signal level of the paper detection signal that the I/F section 213 outputs to the main body controller 110 to fluctuate on the basis of the actual output value of the paper sensors 67. On the other hand, during the transition interval from the paper leading edge detection interval to the paper trailing edge detection interval, the paper detection signal that the I/F section 213 outputs to the main body controller 110 is locked at the signal level corresponding to the end of the paper leading edge detection interval, regardless of the output values of the paper sensors 67 (just prior to entering the transition interval).

The expected point in time of arrival of the leading edge of the paper P and the expected point in time of passage of the trailing edge of the paper P at the installation locations of the paper sensors 67 are points in time that have been calculated on the basis of conveyance path length, conveyance speed, paper size, and the like. The paper leading edge detection interval is an interval of predetermined duration coming at the expected point in time of arrival of the leading edge of the paper P, and the paper trailing edge detection interval is an interval of predetermined duration coming at the expected point in time of passage of the trailing edge of the paper P. Appropriate values for the length (duration) of the paper leading edge detection interval and the paper trailing edge detection interval can be derived by actually conveying multiple sheets of the paper P, and measuring variability of the arrival times and passage times at the installation locations of the paper sensors 67.

Moreover, from the time that the feeding of paper into the paper feed conveyance path 60 is first initiated, to the time of entry into the paper leading edge detection interval, the signal level of the paper detection signal that the I/F section 213 outputs to the main body controller 110 is locked by the paper feed controller 210 of the present embodiment to the level that is the level the I/F section 213 outputs just prior to initiating paper feed into the paper feed conveyance path 60. Furthermore, from the end of the paper trailing edge detection interval until the next paper leading edge detection interval (the interval of paper leading edge detection of the second and subsequent sheets on the basis of the actual output values of the paper sensors 67), the paper detection signal that the I/F section 213 outputs to the main body controller 110 is locked by the paper feed controller 210 of the present embodiment to the level that is the level the I/F section 213 outputs at the end of the paper trailing edge detection interval.

Figure 4:
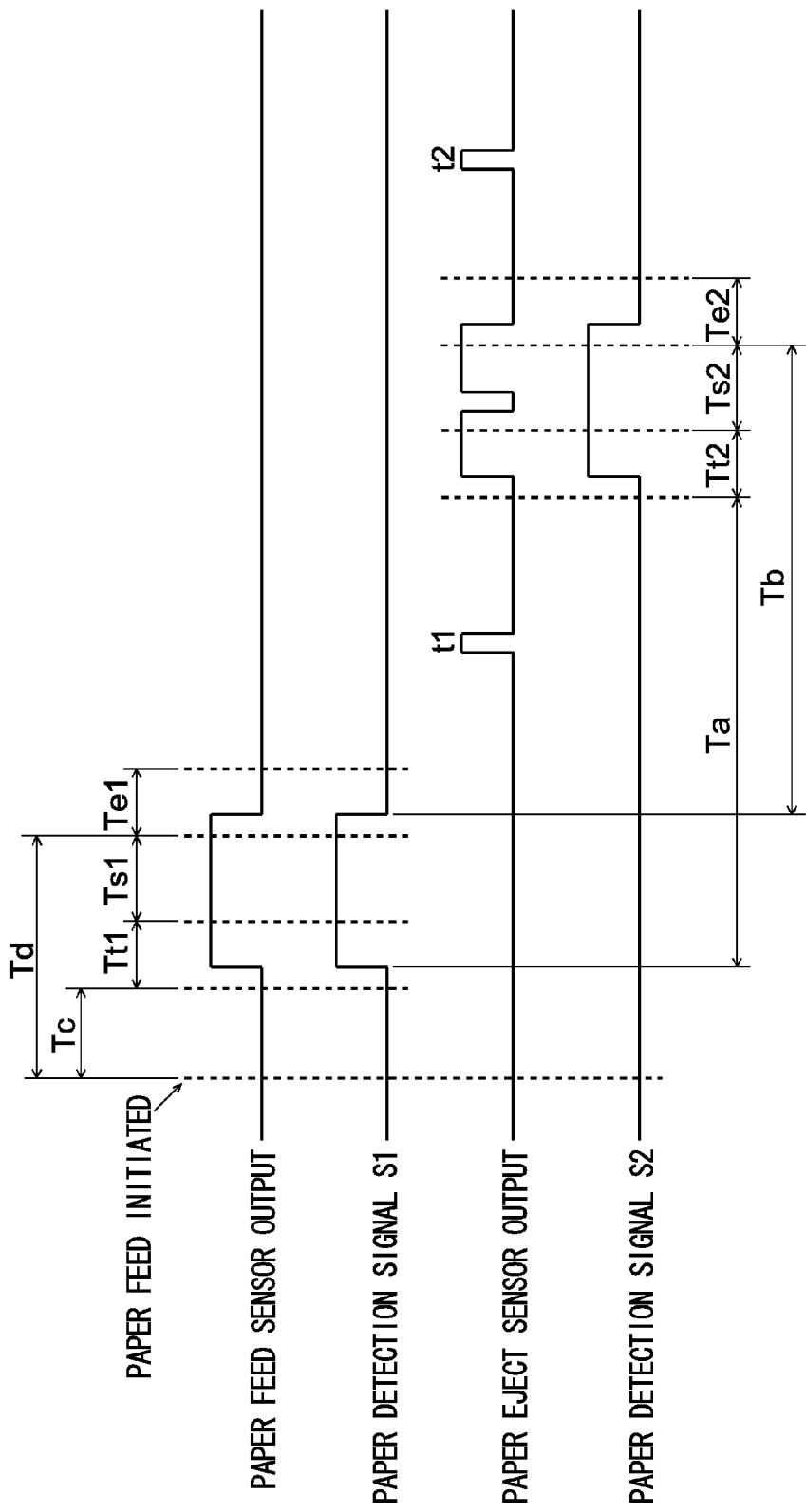
FIG. 4 is a wave diagram of a paper detection signal outputted by the paper-feeding device shown in FIG. 1.

The following more specific description makes reference to FIG. 4. In the following description, the paper leading edge detection interval in which detection of the leading edge of the paper P is performed on the basis of actual output values of the upstream paper feed sensors 67a is designated as paper leading edge detection interval Tt1; the paper trailing edge detection interval in which detection of the trailing edge of the paper P is performed on the basis of actual output values of the upstream paper feed sensors 67a is designated as paper trailing edge detection interval Te1; and the transition interval from the paper leading edge detection interval Tt1 to the paper trailing edge detection interval Te1 is designated as transition interval Ts1. The paper leading edge detection interval in which detection of the leading edge of the paper P is performed on the basis of actual output values of the downstream paper eject sensor 67b is designated as paper leading edge detection interval Tt2; the paper trailing edge detection interval in which detection of the trailing edge of the paper P is performed on the basis of actual output values of the downstream paper eject sensor 67b is designated as paper trailing edge detection interval Te2; and the transition interval from the paper leading edge detection interval Tt2 to the paper trailing edge detection interval Te2 is designated as transition interval Ts2. Furthermore, the paper detection signal generated on the basis of output values of the upstream paper feed sensors 67a is designated as paper detection signal S1, and the paper detection signal generated on the basis of output values of the downstream paper eject sensor 67b is designated as paper detection signal S2.

Assume that, as shown in FIG. 4, during the transition interval Ts2 from the paper leading edge detection interval Tt2 to the paper trailing edge detection interval Te2, the paper eject sensor 67b temporarily experiences abnormal operation, causing the output value of the paper eject sensor 67b to temporarily fall. At this time, the paper feed controller 210 will not cause the temporary fall of the output value of the paper eject sensor 67b to be reflected in the paper detection signal S2. Specifically, in FIG. 4, because the signal level of the paper detection signal S2 just prior to entering the transition interval Ts2 (at the end of the paper leading edge detection interval Tt2) is H level, the paper feed controller 210 locks the paper detection signal S2 at H level.

Moreover, assume that the paper eject sensor 67b experiences temporary abnormal operation, causing the output value of the paper eject sensor 67b to temporarily rise at some point from the time that the feeding of paper into the paper feed conveyance path 60 is first initiated to the time of entry into the paper leading edge detection interval Tt2 (the interval of t1 in FIG. 4). At this time, the paper feed controller 210 will not cause the temporary rise of the output value of the paper eject sensor 67b to be reflected in the paper detection signal S2. Specifically, in FIG. 4, because the signal level of the paper detection signal S2 just prior to initiating paper feed into the paper feed conveyance path 60 is L level, the paper feed controller 210 locks the paper detection signal S2 at L level.

Further assume that the paper eject sensor 67b experiences temporary abnormal operation, causing the output value of the paper eject sensor 67b to temporarily rise at some point from the end of the paper trailing edge detection interval Te2 to before entering the next paper leading edge detection interval Tt2 (the interval of t2 in FIG. 4). At this time, the paper feed controller 210 will not cause the temporary rise of the output value of the paper eject sensor 67b to be reflected in the paper detection signal S2. Specifically, in FIG. 4, because the signal level of the paper detection signal S2 at the end of the paper trailing edge detection interval Te2 is L level, the paper feed controller 210 locks the paper detection signal S2 at L level. However, when the paper trailing edge detection interval Te2 has ended and a standby interval is entered (an interval in which a paper feed instruction from the main body controller 110 is awaited), there is no need to lock the signal level of the paper detection signal S2.

The paper feed controller 210 sets the starting point of the paper leading edge detection interval Tt2, in which detection of the leading edge of the paper P is performed on the basis of actual output values of the downstream paper eject sensor 67b, to a point in time at which a predetermined time Ta has elapsed since the upstream paper feed sensors 67a detected the leading edge of the paper P. The time Ta for the purpose of setting the starting point of the paper leading edge detection interval Tt2 can be selected on the basis of conveyance path length, conveyance speed, paper size, and the like. A time Tb for the purpose of setting the starting point of the paper trailing edge detection interval Te2, discussed below, is selected analogously, as are times Tc and Td for the purpose of setting the starting points of the paper leading edge detection interval Tt1 and the paper trailing edge detection interval Te1.

The paper feed controller 210 sets the starting point of the paper trailing edge detection interval Te2, in which detection of the trailing edge of the paper P is performed on the basis of actual output values of the downstream paper eject sensor 67b, to a point in time at which a predetermined time Tb has elapsed since the upstream paper feed sensors 67a detected the leading edge of the paper P. Alternatively, the starting point may be set to a point in time at which a predetermined time has elapsed since the paper eject sensor 67b detected the leading edge of the paper P.

The paper feed controller 210 moreover sets the starting points of the paper leading edge detection interval Tt1 and the paper trailing edge detection interval Te1, in which detection of the paper P is performed on the basis of actual output values of the upstream paper feed sensors 67a, to points in time at which predetermined intervals Tc and Td have elapsed since paper feed to the paper feed conveyance path 60 by the paper feeding section 63 was initiated (since the clutch CL was turned on).

Next, the operation when the paper-feeding device 200 supplies the paper P to the main body section 100a of the image forming apparatus 100 (the paper P detection operation by the paper feed sensors 67a, which are the paper sensors 67 at the upstream side of the paper feed conveyance path 60) is described with reference to FIGS. 5 and 6.

Figure 5:
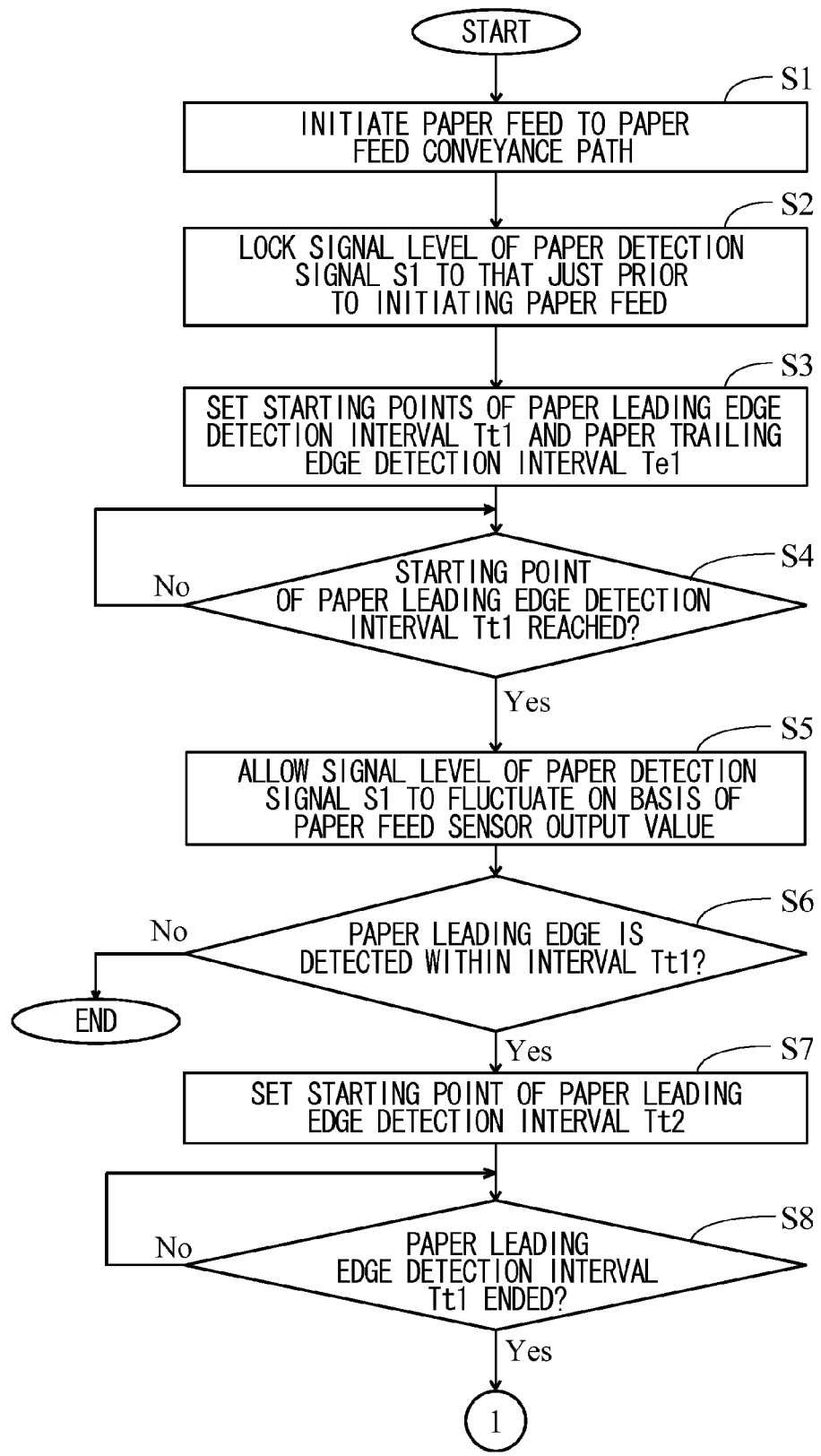
FIG. 5 is a drawing showing the flow of a paper feed operation (a paper detection operation by a paper sensor at the upstream side of the paper feed conveyance path) performed in the paper-feeding device shown in FIG. 1.
Figure 6:
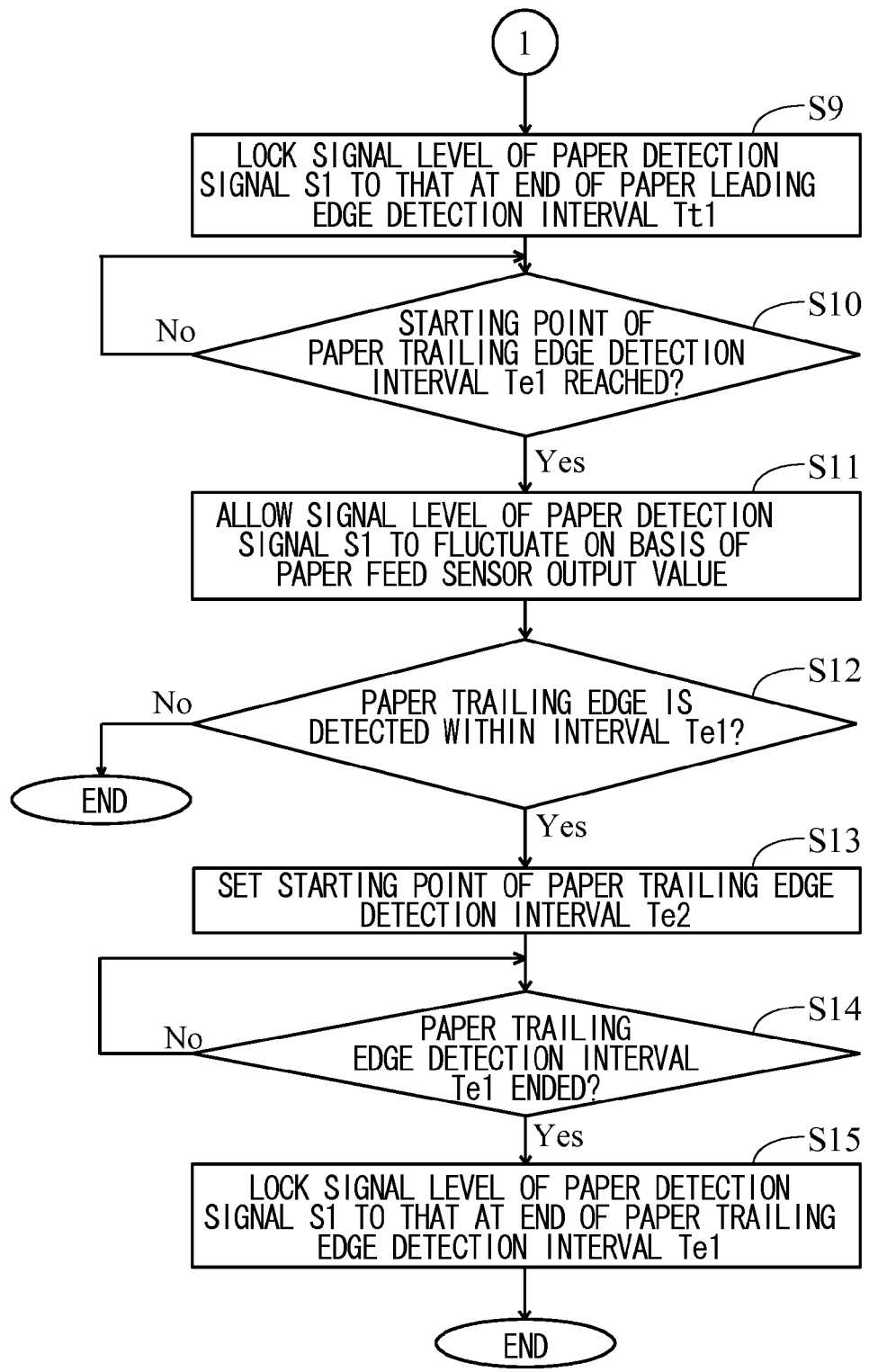
FIG. 6 is a drawing showing the flow of a paper feed operation (a paper detection operation by a paper sensor at the upstream side of the paper feed conveyance path) performed in the paper-feeding device shown in FIG. 1.

Firstly, at the start point of the flow in FIG. 5, the paper feed controller 210 outputs the paper detection signal S1 to the main body controller 110. Let it be assumed that, at this time, the signal level of the paper detection signal S1 is L level, showing that the paper P is not detected. Then, once the paper feed controller 210 has received a paper feed instruction from the main body controller 110, the flow in FIG. 5 starts.

In Step S1, the paper feed controller 210 switches the clutch CL on, and drives the paper P feeding section 63. Specifically, the paper feeding section 63 initiates the feeding of paper into the paper feed conveyance path 60. Next, in Step S2, the paper feed controller 210 locks the paper detection signal S1 that the I/F section 213 (output section) outputs to the main body controller 110 to L level, which is the signal level showing that the paper P is not detected (the signal level just prior to initiating paper feed).

In Step S3, the paper feed controller 210 sets the starting points of the paper leading edge detection interval Tt1 and the paper trailing edge detection interval Te1 to points in time at which the predetermined times Tc and Td have elapsed since the feeding of paper by the paper feeding section 63 was initiated (since the clutch CL was turned on, and the paper feeding section 63 was driven). Then, in Step S4, the paper feed controller 210 determines whether the time elapsed since Step S1 (the time elapsed since driving of the paper feeding section 63 was initiated) has exceeded the time Tc, i.e., whether the starting point of the paper leading edge detection interval Tt1 has been reached. When the result of the determination is that the starting point of the paper leading edge detection interval Tt1 has been reached, the routine transitions to Step S5. On the other hand, when the starting point of the paper leading edge detection interval Tt1 has not been reached, the operation of Step S4 is repeated.

Upon transitioning to Step S5, the paper feed controller 210 allows the signal level of the paper detection signal S1 that the I/F section 213 outputs to the main body controller 110 during the paper leading edge detection interval Tt1 to fluctuate on the basis of the actual output values of the paper feed sensors 67a. Then, in Step S6, the paper feed controller 210 determines whether the leading edge of the paper P has reached the paper feed sensors 67a within the paper leading edge detection interval Tt1. When the result of the determination is that the leading edge of the paper P has reached the paper feed sensors 67a, the routine transitions to Step S7. On the other hand, when the paper feed controller 210 determines that leading edge of the paper P has not reached the paper feed sensors 67a, the paper feed controller 210 continues to prompt the I/F section 213 to output to the main body controller 110 a paper detection signal S1 showing that the leading edge of the paper P is not detected. Consequently, the main body controller 110 determines that the paper P is not being supplied to the paper feed conveyance path 60 (a paper non-feed jam has occurred), and suspends the printing output operation (suspends the paper feed operation in the paper-feeding device 200).

Upon transitioning to Step S7, the paper feed controller 210 sets the starting point of the paper leading edge detection interval Tt2 to a point in time at which the predetermined time Ta has elapsed since the paper feed controller 210 determined that the leading edge of the paper P reached the paper feed sensors 67a.

In Step S8, the paper feed controller 210 determines whether the paper leading edge detection interval Tt1 has ended (whether the transition interval Ts1 has started). When the result of the determination is that the paper leading edge detection interval Tt1 has ended (that the transition interval Ts1 has started), the routine transitions to Step S9. When the paper leading edge detection interval Tt1 has not ended (the transition interval Ts1 has not started), the operation of Step S8 is repeated. Upon transitioning to Step S9, the signal level of the paper detection signal S1 that the I/F section 213 outputs to the main body controller 110 during the transition interval Ts1 is locked by the paper feed controller 210 to the level at the end of the paper leading edge detection interval Tt1 (just prior to entering the transition interval Ts1), regardless of the output values of the paper feed sensors 67a.

In Step S10, the paper feed controller 210 determines whether the time elapsed since Step S1 has exceeded the time Td, i.e., whether the starting point of the paper trailing edge detection interval Te1 has been reached (whether the transition interval Ts1 is finished). When the result of the determination is that the starting point of the paper trailing edge detection interval Te1 has been reached (the transition interval Ts1 is finished), the routine transitions to Step S11. On the other hand, when the starting point of the paper trailing edge detection interval Te1 has not been reached (the transition interval Ts1 is not finished), the operation of Step S10 is repeated.

Upon transitioning to Step S11, the paper feed controller 210 allows the signal level of the paper detection signal S1 that the I/F section 213 outputs to the main body controller 110 during the paper trailing edge detection interval Te1 to fluctuate on the basis of the actual output values of the paper feed sensors 67a. Then, in Step S12, the paper feed controller 210 determines whether the trailing edge of the paper P has reached the paper feed sensors 67a within the paper trailing edge detection interval Te1. When the result of the determination is that the trailing edge of the paper P has reached the paper feed sensors 67a, the routine transitions to Step S13. On the other hand, when the paper feed controller 210 determines that trailing edge of the paper P has not reached the paper feed sensors 67a, the paper feed controller 210 continues to prompt the I/F section 213 to output to the main body controller 110 a paper detection signal S1 showing that the trailing edge of the paper P is not detected. Consequently, the main body controller 110 determines that a jam has occurred at the upstream side of the paper feed conveyance path 60, and suspends the printing output operation (suspends the paper feed operation in the paper-feeding device 200).

Upon transitioning to Step S13, the paper feed controller 210 sets the starting point of the paper trailing edge detection interval Te2 to a point in time at which the predetermined time Tb has elapsed since the paper feed controller 210 determined that the trailing edge of the paper P reached the paper feed sensors 67a.

In Step S14, the paper feed controller 210 determines whether the paper trailing edge detection interval Te1 has ended. When the result of the determination is that the paper trailing edge detection interval Te1 has ended, the routine transitions to Step S15. When the paper trailing edge detection interval Te1 has not ended, the operation of Step S14 is repeated.

Upon transitioning to Step S15, the signal level of the paper detection signal S1 outputted to the main body controller 110 is locked by the paper feed controller 210 to the level at the end of the paper trailing edge detection interval Te1. Then, from the end of the paper trailing edge detection interval Te1 until the next paper leading edge detection interval Tt1 is entered, the signal level of the paper detection signal S1 continues to be locked by the paper feed controller 210 to the level at the end of the paper trailing edge detection interval Te1.

Next, the operation for detecting paper P whereby the eject paper sensor 67b, which is the paper sensor 67 at the downstream side of the paper feed conveyance path 60, when the paper-feeding device 200 supplies the paper P to the main body section 100a of the image forming apparatus 100 is described with reference to FIGS. 7 and 8.

Figure 7:
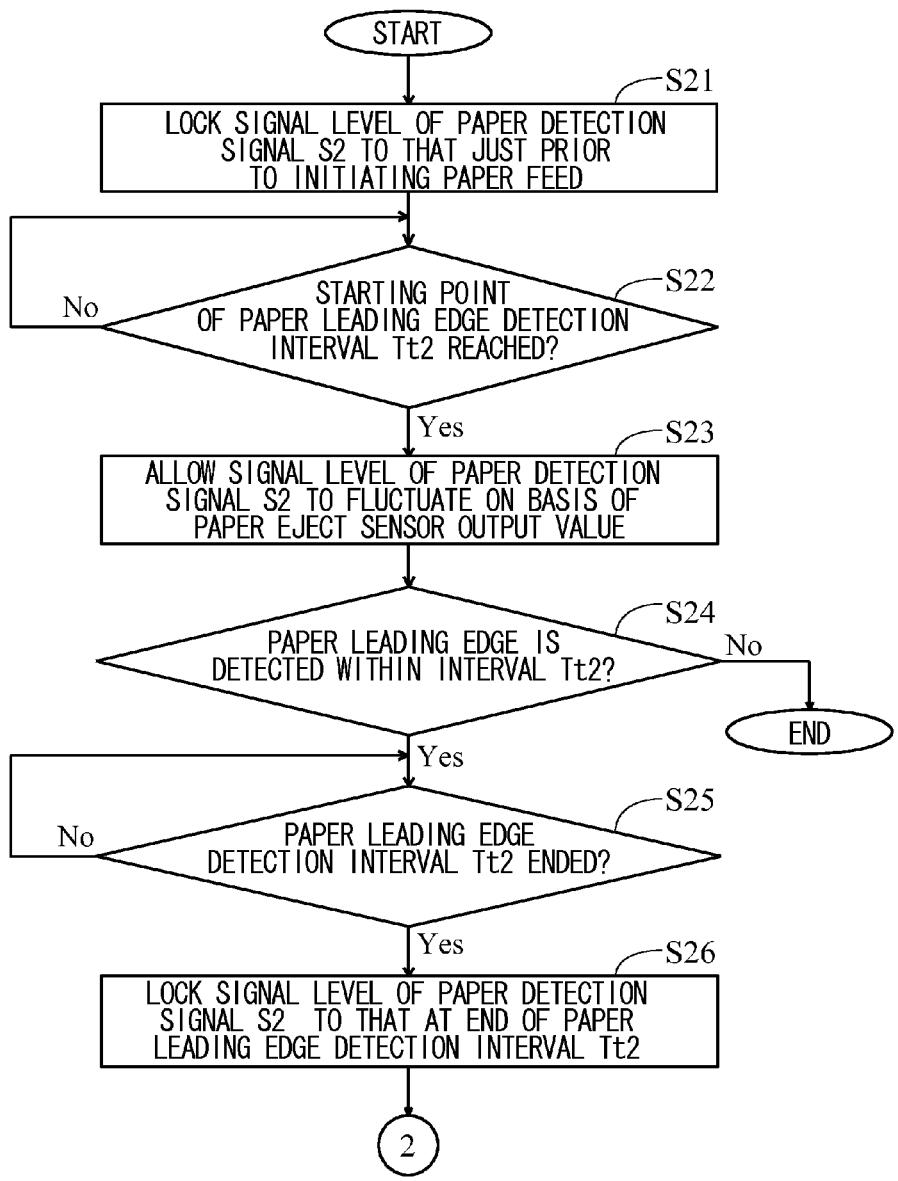
FIG. 7 is a drawing showing the flow of a paper feed operation (a paper detection operation by a paper sensor at the downstream side of the paper feed conveyance path) performed in the paper-feeding device shown in FIG. 1.
Figure 8:
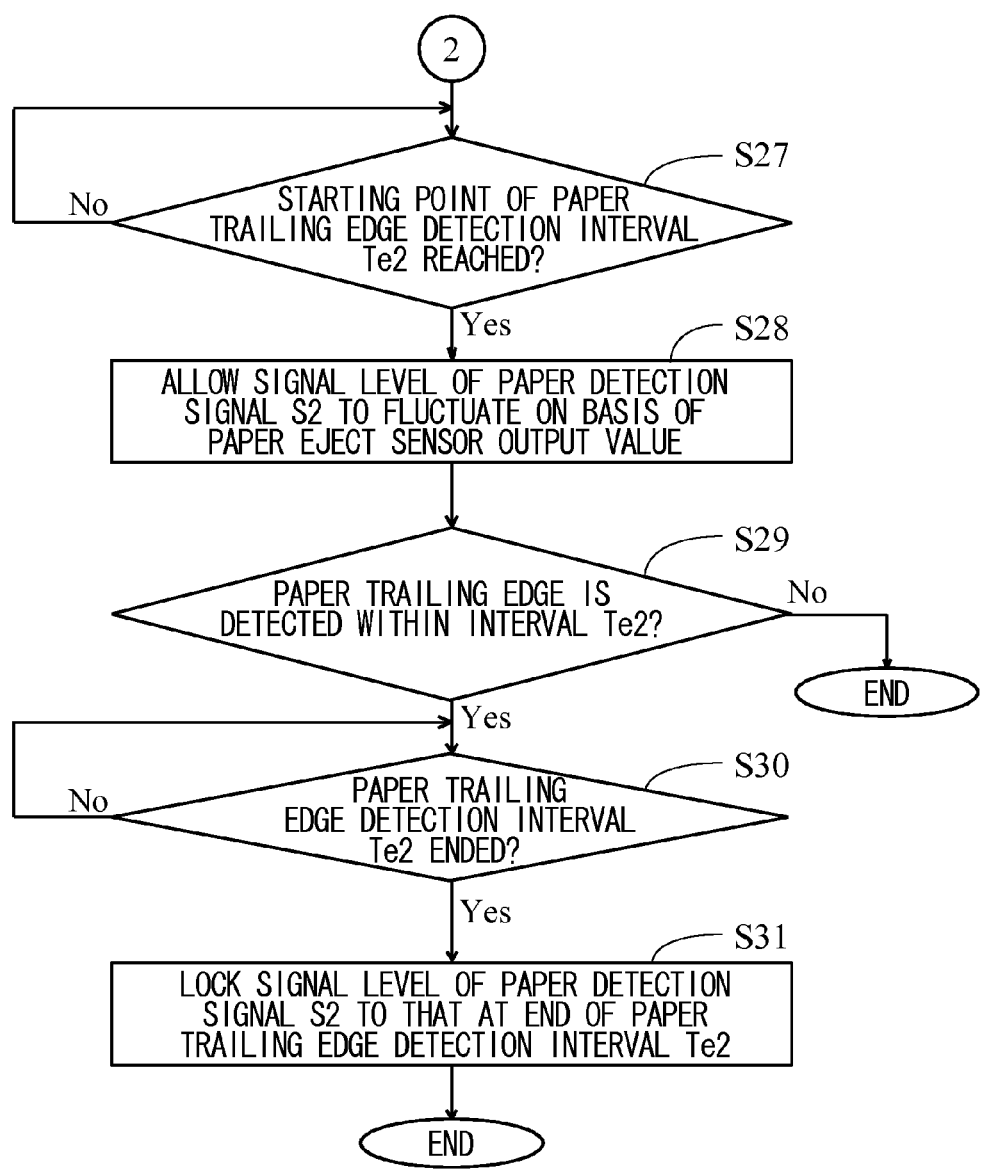
FIG. 8 is a drawing showing the flow of a paper feed operation (a paper detection operation by a paper sensor at the downstream side of the paper feed conveyance path) performed in the paper-feeding device shown in FIG. 1.

Firstly, at the start point of the flow in FIG. 7, the paper feed controller 210 outputs the paper detection signal S2 to the main body controller 110. Let it be assumed that, at this time, the signal level of the paper detection signal S2 is a level showing that the paper P is not detected. Then, once the paper feed controller 210 has received a paper feed instruction from the main body controller 110, the flow in FIG. 7 starts.

In Step S21, the paper feed controller 210 locks the paper detection signal S2 outputted to the main body controller 110, at a signal level showing that the paper P is not detected (L level, which is the signal level just prior to initiating paper feed). As long as the paper P is not detected by the paper feed sensors 67a, no subsequent operations are performed.

In Step S22, the paper feed controller 210 determines whether the time elapsed since the leading edge of the paper P arrived at the paper feed sensors 67a has exceeded the time Ta, i.e., whether the starting point of the paper leading edge detection interval Tt2 has been reached. When the result of the determination is that the starting point of the paper leading edge detection interval Tt2 has been reached, the routine transitions to Step S23. On the other hand, when the starting point of the paper leading edge detection interval Tt2 has not been reached, the operation of Step S22 is repeated.

Upon transitioning to Step S23, the paper feed controller 210 allows the signal level of the paper detection signal S2 outputted to the main body controller 110 during the paper leading edge detection interval Tt2 to fluctuate on the basis of the actual output value of the paper eject sensor 67b. Then, in Step S24, the paper feed controller 210 determines whether the leading edge of the paper P has reached the paper eject sensor 67b within the paper leading edge detection interval Tt2. When the result of the determination is that the leading edge of the paper P has reached the paper eject sensor 67b, the routine transitions to Step S25. On the other hand, when the paper feed controller 210 determines that the leading edge of the paper P has not reached the paper eject sensor 67b, the paper feed controller 210 continues to prompt the I/F section 213 to output to the main body controller 110 a paper detection signal S2 showing that the leading edge of the paper P is not detected. Consequently, the main body controller 110 determines that a jam has occurred, and suspends the printing output operation (suspends the paper feed operation in the paper-feeding device 200).

Upon transitioning to Step S25, the paper feed controller 210 determines whether the paper leading edge detection interval Tt2 has ended (whether the transition interval Ts2 has started). When the result of the determination is that the paper leading edge detection interval Tt2 has ended (that the transition interval Ts2 has started), the routine transitions to Step S26. On the other hand, when the paper leading edge detection interval Tt2 has not ended (the transition interval Ts2 has not started), the operation of Step S25 is repeated. Upon transitioning to Step S26, the signal level of the paper detection signal S2 that is outputted to the main body controller 110 during the transition interval Ts2 is locked by the paper feed controller 210 to the level at the end of the paper leading edge detection interval Tt2 (just prior to entering the transition interval Ts2), regardless of the output values of the paper eject sensor 67b.

In Step S27, the paper feed controller 210 determines whether the time elapsed since the trailing edge of the paper P reached the paper feed sensors 67a has exceeded the time Tb, i.e., whether the starting point of the paper trailing edge detection interval Te2 has been reached (whether the transition interval Ts2 is finished). When the result of the determination is that the starting point of the paper trailing edge detection interval Te2 has been reached (the transition interval Ts2 is finished), the routine transitions to Step S28. When the starting point of the paper trailing edge detection interval Te2 has not been reached (the transition interval Ts2 is not finished), the operation of Step S27 is repeated.

Upon transitioning to Step S28, the paper feed controller 210 allows the paper detection signal S2 that is outputted to the main body controller 110 during the paper trailing edge detection interval Te2 to fluctuate on the basis of the actual output value of the paper eject sensor 67b. Then, in Step S29, the paper feed controller 210 determines whether the trailing edge of the paper P has reached the paper eject sensor 67b within the paper trailing edge detection interval Te2. When the result of the determination is that the trailing edge of the paper P has reached the paper eject sensor 67b, the routine transitions to Step S30. On the other hand, when the paper feed controller 210 determines that trailing edge of the paper P has not reached the paper eject sensor 67b (when it cannot be verified by the paper feed controller 210 that the output of the paper eject sensor 67b is an output showing that the trailing edge of the paper P has passed the paper eject sensor 67b), the paper feed controller 210 continues to prompt the I/F section 213 to output to the main body controller 110 a paper detection signal S2 showing that the trailing edge of the paper P is not detected. Consequently, the main body controller 110 determines that a jam has occurred, and suspends the printing output operation (suspends the paper feed operation in the paper-feeding device 200).

In Step S30, the paper feed controller 210 determines whether the paper trailing edge detection interval Te2 has ended. When the result of the determination is that the paper trailing edge detection interval Te2 has ended, the routine transitions to Step S31. On the other hand, when the paper trailing edge detection interval Te2 has not ended, the operation of Step S30 is repeated.

Upon transitioning to Step S31, the signal level of the paper detection signal S2 outputted to the main body controller 110 is locked by the paper feed controller 210 to the level at the end of the paper trailing edge detection interval Te2. Then, from the end of the paper trailing edge detection interval Te2 until the next paper leading edge detection interval Tt2 is entered, the signal level of the paper detection signal S2 continues to be locked by the paper feed controller 210 at the level at the end of the paper trailing edge detection interval Te2.

As described above, according to the present embodiment, the paper feed controller 210 (paper detection section), during paper leading edge detection intervals that include the expected point in time of arrival of the leading edge of the paper P at the paper sensor 67 installation locations, and during paper trailing edge detection intervals that include the expected point in time of passage of the trailing edge of the paper P through the paper sensor 67 installation locations, allows the signal level of the paper detection signal that the I/F section 213 (output section) outputs to the main body controller 110 (main body section 100a) to fluctuate on the basis of the actual output values of the paper sensors 67; and during transition intervals from the paper leading edge detection interval to the paper trailing edge detection interval, locks the paper detection signal that the I/F section 213 outputs to the main body controller 110, to the signal level at the end of the paper leading edge detection interval, regardless of the output values of the paper sensors 67. Therefore, even if a paper sensor 67 temporarily experiences abnormal operation during a transition interval from the paper leading edge detection interval to the paper trailing edge detection interval, the actual output value of the paper sensor 67 during the transition interval is not reflected in the paper detection signal, whereby the signal level of the paper detection signal that the main body controller 110 receives from the I/F section 213 during the transition interval is unchanged from the signal level just prior to entering the transition interval.

As long as the paper feed controller 210 detects the paper leading edge during the paper leading edge detection interval, for the duration of the transition interval from the paper leading edge detection interval to the paper trailing edge detection interval, the paper detection signal that the I/F section 213 outputs to the main body controller 110 is maintained at the signal level just prior to entering the transition interval (at the end of the paper leading edge detection interval), specifically, a signal level showing that the paper P is detected.

The inconvenience of not being able to obtain a paper detection signal that shows the actual state of conveyance of the paper P, due to temporarily abnormal operation of the paper sensors 67 during the transition interval, can be minimized thereby. As a result, it is possible to reduce detection errors during detection of the state of conveyance of the paper P.

Moreover, according to the present embodiment, from the time that the feeding of paper into the paper feed conveyance path 60 is first initiated, until the paper leading edge detection interval is entered, the signal level of the paper detection signal that the I/F section 213 outputs to the main body controller 110 is locked by the paper feed controller 210 at the level just prior to initiating paper feed. The inconvenience of not being able to obtain a paper detection signal that shows the actual state of conveyance of the paper P, due to temporarily abnormal operation of the paper sensors 67 between the time that the feeding of paper into the paper feed conveyance path 60 is first initiated, until the paper leading edge detection interval is entered, can be minimized thereby. As a result, it is possible to further reduce detection errors during detection of the state of conveyance of the paper P.

Moreover, according to the present embodiment, between the end of the paper trailing edge detection interval and entry into the next paper leading edge detection interval, the signal level of the paper detection signal that the I/F section 213 outputs to the main body controller 110 is locked by the paper feed controller 210 at the level at the end of the paper trailing edge detection interval. The inconvenience of not being able to obtain a paper detection signal that shows the actual state of conveyance of the paper P, due to temporarily abnormal operation of the paper sensors 67 between the end of a paper trailing edge detection interval and entry into the next paper leading edge detection interval, can be minimized thereby. As a result, it is possible to further reduce detection errors during detection of the state of conveyance of the paper P.

Moreover, according to the present embodiment, the paper feed controller 210 sets the starting point of the paper leading edge detection interval Tt2, in which detection of the leading edge of the paper P is performed on the basis of actual output values of the downstream paper eject sensor 67b, to a point in time at which the predetermined time Ta has elapsed since the leading edge of the paper P passed through the upstream paper feed sensors 67a detected. Therefore, even when there is variability in the arrival time of the leading edge of the paper P at the installation locations of the upstream paper feed sensors 67, the starting point of the paper leading edge detection interval Tt2, in which detection of the leading edge of the paper P is performed on the basis of actual output values of the downstream paper eject sensor 67b, can be easily set to an appropriate point in time.

Moreover, according to the present embodiment, the paper feed controller 210 sets the starting point of the paper trailing edge detection interval Te2, in which detection of the trailing edge of the paper P is performed on the basis of actual output values of the downstream paper eject sensor 67b, to the point in time at which the predetermined time Tb has elapsed since the trailing edge of the paper P passed through the upstream paper feed sensors 67a. Therefore, even when there is variability in the passage time of the trailing edge of the paper P through the installation locations of the upstream paper feed sensors 67, the starting point of the paper trailing edge detection interval Te2, in which detection of the trailing edge of the paper P is performed on the basis of actual output values of the downstream paper eject sensor 67b, can be easily set to an appropriate point in time.

Moreover, according to the present embodiment, the paper feed controller 210 sets the starting points of the paper leading edge detection interval Tt1 and the paper trailing edge detection interval Te1, in which detection of the paper P is performed on the basis of actual output values of the upstream paper feed sensors 67a, to points in time at which the predetermined times Tc and Td have elapsed since the paper feeding section 63 initiated paper feeding. Therefore, the starting points of the paper leading edge detection interval Tt1 and the paper trailing edge detection interval Te1, in which detection of the leading edge of the paper P and the paper trailing edge of the paper P are performed on the basis of actual output values of the upstream paper feed sensors 67a, can be easily set to appropriate points in time.

The embodiments disclosed herein are in all respects merely exemplary, and should not be construed as limiting. The scope of the present disclosure is shown by the scope of the claims, not by the preceding description of the embodiments, and further includes all modifications equivalent in meaning to and falling within the scope of the claims.

What is claimed is:

1. A paper-feeding device adapted to feed paper to a main body section of an image forming apparatus for printing and outputting paper, the paper-feeding device comprising:
   a conveyance path for conveying the paper towards the main body section;
   a paper detection section that has a paper sensor for detecting paper on the conveyance path, and that, on the basis of an output value of the paper sensor, generates a paper detection signal, the paper detection signal being a signal indicating a length of time that elapses after a leading edge of paper arrives at a paper sensor installation location until a trailing edge of the paper that has arrived at the paper sensor installation location passes by the same paper sensor installation location, the paper detection signal being a signal showing the state of conveyance of the paper; and
   an output section for outputting the paper detection signal to the main body section, the main body section recognizing the state of conveyance of the paper on the basis of the paper detection signal; wherein,
   during a paper leading edge detection interval that includes an expected point in time of arrival of a paper leading edge at a paper sensor installation location, and during a paper trailing edge detection interval that includes an expected point in time of passage of a paper trailing edge through the paper sensor installation location, the paper detection section allowing the signal level of the paper detection signal that the output section outputs to the main body section to fluctuate on the basis of an actual output value of the paper sensor, and
   even when an actual output value of the paper sensor varies during conveyance of the paper in a transition interval from the paper leading edge detection interval to the paper trailing edge detection interval, the paper detection section generates, as the paper detection signal which the output section outputs to the main body section, a signal having a level equal to a signal level of the paper detection signal at an end of the paper leading edge detection interval,
   the paper sensor has a light-emitting section, a light-receiving section, and an actuator that rotates by coming into contact with the paper,
   when the paper is not present at the paper sensor installation location, the actuator obstructs an optical path between the light-emitting section and the light-receiving section, and when the paper is present at the paper sensor installation location, the actuator rotates not to obstruct the optical path between the light-emitting section and the light-receiving section, whereby the output value of the paper sensor changes depending on whether the paper is present at the paper sensor installation location or not.

2. The paper-feeding device according to claim 1, wherein, from the time that feeding of paper into the conveyance path is first initiated until the paper leading edge detection interval is entered, the paper detection section locks the paper detection signal that the output section outputs to the main body section, to the signal level just before the feeding of paper into the conveyance path is started.

3. The paper-feeding device according to claim 1, wherein, from the end of the paper trailing edge detection interval until entering the paper leading edge detection interval next time, the paper detection section locks the paper detection signal that the output section outputs to the main body section, to the signal level at the end of the paper trailing edge detection interval.

4. The paper-feeding device according to claim 1, a plurality of the paper sensors being equipped on the conveyance path; and
   wherein, the paper detection section sets the starting point of the paper leading edge detection interval, in which detection of the paper leading edge is performed on the basis of an actual output value of a paper sensor that, of the plurality of paper sensors, is one installed on the downstream side of the conveyance path, to a point in time at which a predetermined time has elapsed since the leading edge of the paper was detected by a paper sensor that, of the plurality of paper sensors, is one installed on the upstream side of the conveyance path.

5. The paper-feeding device according to claim 4, wherein, the paper detection section sets the starting point of the paper trailing edge detection interval, in which detection of the paper trailing edge is performed on the basis of an actual output value of the paper sensor installed on the downstream side of the conveyance path, to a point in time at which a predetermined time has elapsed since the trailing edge of the paper is detected by using the paper sensor installed on the upstream side of the conveyance path.

6. The paper-feeding device according to claim 4,
wherein, the paper detection section sets the starting points of the paper leading edge detection interval and the paper trailing edge detection interval, in which detection of the paper is performed on the basis of an actual output value of the paper sensor installed on the upstream side of the conveyance path, to points in time at which a predetermined time has elapsed since the feeding of paper into the conveyance path has started.

7. An image forming apparatus provided with the paper-feeding device according to claim 1, and adapted for printing and outputting paper supplied by the paper-feeding device.

8. A method for controlling a paper-feeding device adapted to feed paper to a main body section of an image forming apparatus for printing and outputting paper, the method comprising:
a step of supplying the paper to a conveyance path for conveying the paper towards the main body section;
a step of generating a paper detection signal that shows the state of conveyance of the paper, on the basis of an output value of a paper sensor for detecting paper on the conveyance path, the paper detection signal being a signal indicating a length of time that elapses after a leading edge of paper arrives at a paper sensor installation location until a trailing edge of the paper that has arrived at the paper sensor installation location passes by the same paper sensor installation location, the paper detection signal being a signal; and
a step of outputting the paper detection signal to the main body section, the main body section recognizing the state of conveyance of the paper on the basis of the paper detection signal; wherein,
the step of generating a paper detection signal including a step in which, during a paper leading edge detection interval that includes an expected point in time of arrival of a paper leading edge at a paper sensor installation location, and during a paper trailing edge detection interval that includes an expected point in time of passage of the paper trailing edge through the paper sensor installation location, the signal level of the paper detection signal that is outputted to the main body section is allowed to fluctuate on the basis of an actual output value of the paper sensor, and
when an actual output value of the paper sensor varies during conveyance of the paper in a transition interval from the paper leading edge detection interval to the paper trailing edge detection interval, the paper detection section generates, as the paper detection signal which the output section outputs to the main body section, a signal having a level equal to a signal level of the paper detection signal at an end of the paper leading edge detection interval;
the paper sensor has a light-emitting section, a light-receiving section, and an actuator that rotates by coming into contact with the paper,
when the paper is not present at the paper sensor installation location, the actuator obstructs an optical path between the light-emitting section and the light-receiving section, and when the paper is present at the paper sensor installation location, the actuator rotates not to obstruct the optical path between the light-emitting section and the light-receiving section, whereby the output value of the paper sensor changes depending on whether the paper is present at the paper sensor installation location or not.

9. The method for controlling a paper-feeding device according to claim 8,
wherein, the step of generating the paper detection signal includes a step in which, from the time that the feeding of paper into the conveyance path is first initiated until the paper leading edge detection interval is entered, the paper detection signal outputted to the main body section is locked to the signal level just before the feeding of paper into the conveyance path is started.

10. The method for controlling a paper-feeding device according to claim 8,
wherein, the step of generating the paper detection signal includes a step in which, from the end of the paper trailing edge detection interval until entering the paper leading edge detection interval next time, the paper detection signal that is outputted to the main body section is locked to the signal level at the end of the paper trailing edge detection interval.

11. The method for controlling a paper-feeding device according to claim 8,
wherein, a plurality of the paper sensors being equipped on the conveyance path, and
the step of generating the paper detection signal includes a step in which the starting point of the paper leading edge detection interval, in which detection of the paper leading edge is performed on the basis of the actual output value of a paper sensor that, of the plurality of paper sensors, is one installed on the downstream side of the conveyance path, is set to a point in time at which a predetermined time has elapsed since the leading edge of the paper was detected by a paper sensor that, of the plurality of paper sensors, is one installed on the upstream side of the conveyance path.

12. The method for controlling a paper-feeding device according to claim 11,
wherein, the step of generating the paper detection signal includes a step in which the starting point of the paper trailing edge detection interval, in which detection of the paper trailing edge is performed on the basis of the actual output value of the paper sensor installed on the downstream side of the conveyance path, is set to a point in time at which a predetermined time has elapsed since the trailing edge of the paper was detected by the paper sensor installed on the upstream side of the conveyance path.

13. The method for controlling a paper-feeding device according to claim 11,
wherein, the step of generating the paper detection signal includes a step in which the starting points of the paper leading edge detection interval and the paper trailing edge detection interval, in which detection of the paper is performed on the basis of the actual output value of the paper sensor installed on the upstream side of the conveyance path, are set to points in time at which a predetermined time has elapsed since the feeding of paper into the conveyance path has started.

* * * * *